997,886. CAMERA. SYLVESTER JAMES WEST, Selma, N. C. Filed June 16, 1910. Serial No. 567,209.

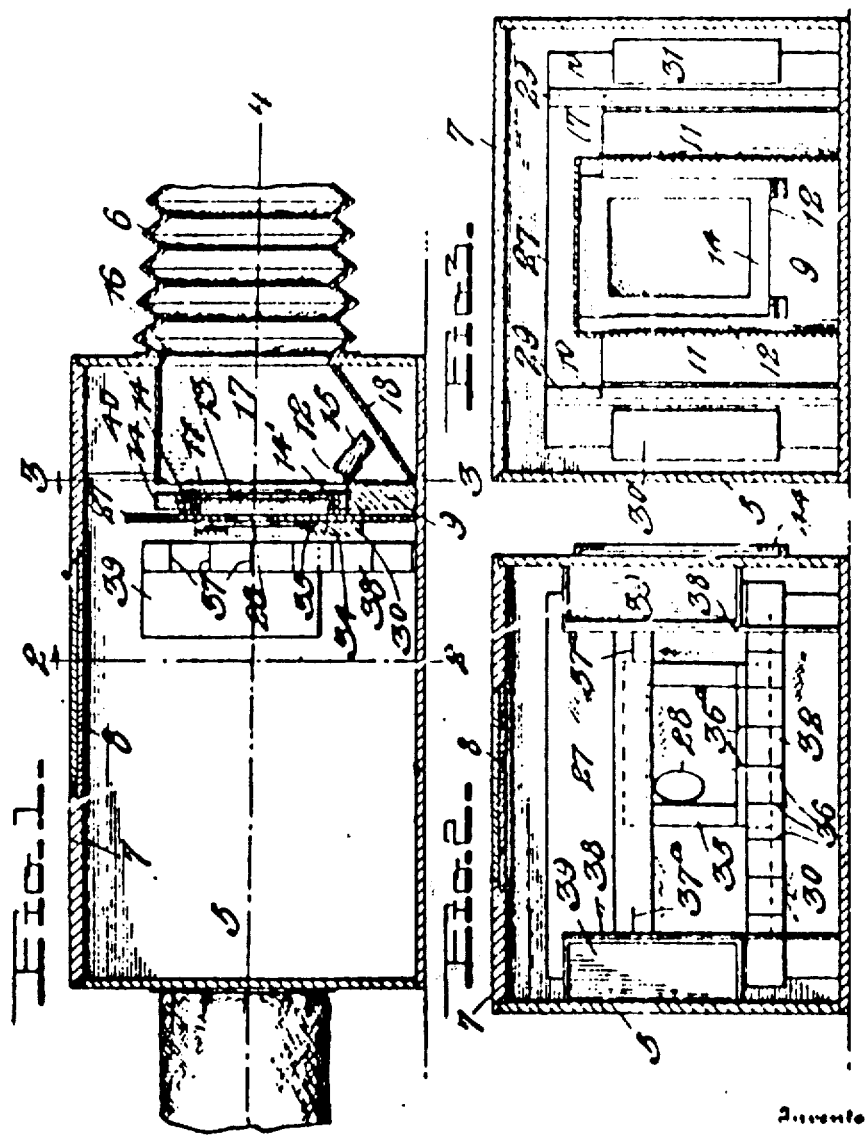

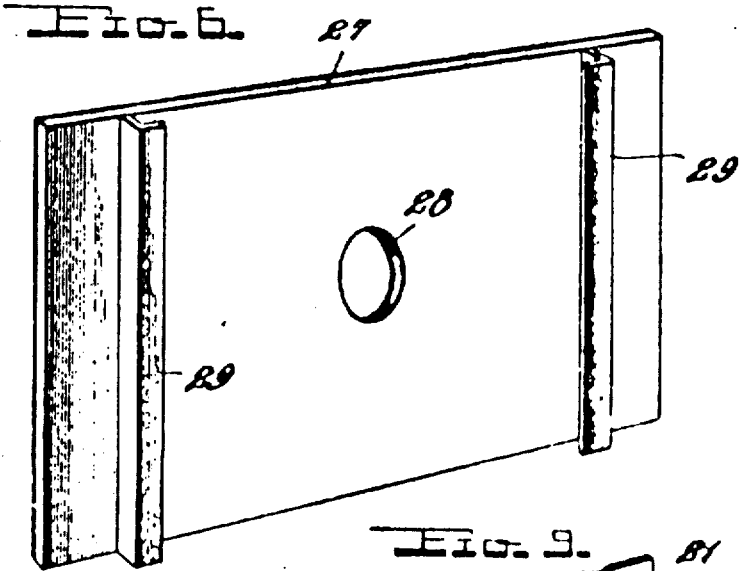
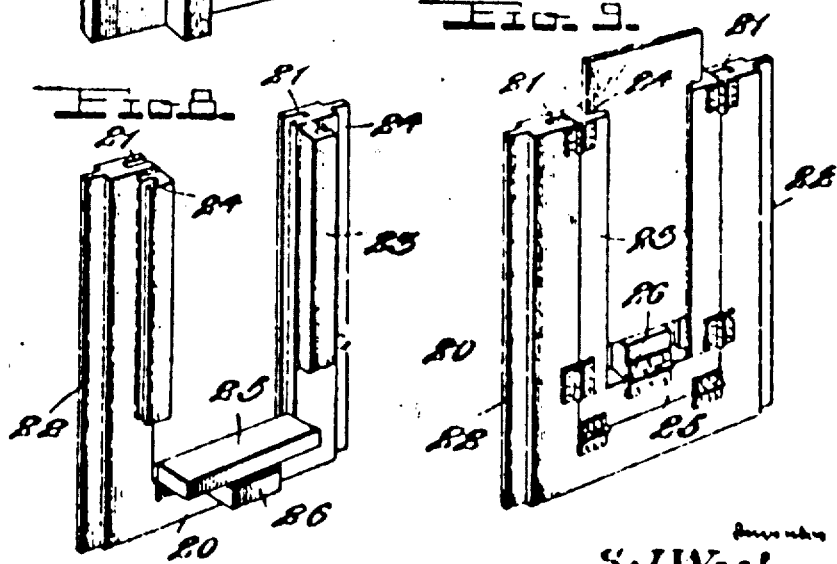

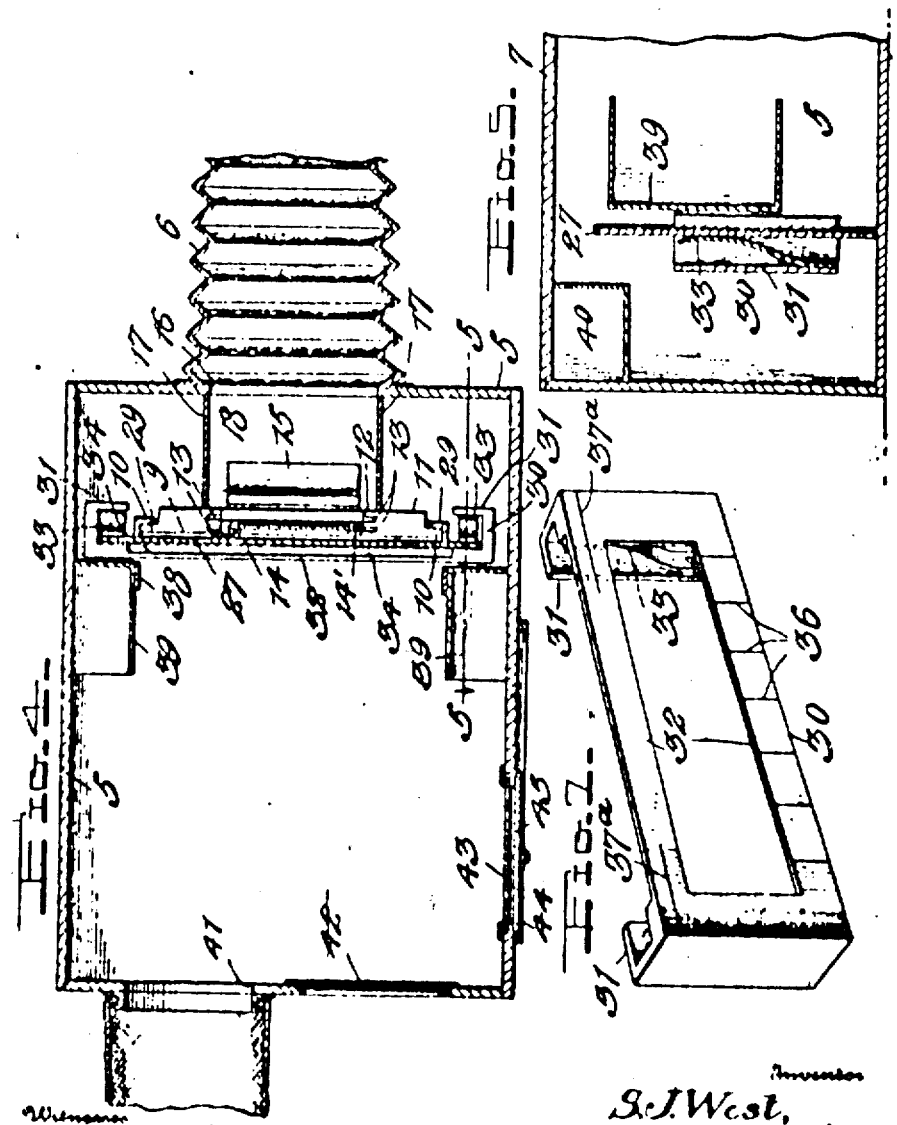

*To all whom it may concern:*

Be it known that I, SYLVESTER J. WEST, a citizen of the United States, residing at Selma, in the county of Johnston and State of North Carolina, have invented certain new and useful Improvements in Cameras, of which the following is a specification, reference being had to the accompanying drawings.

This invention relates to improvements in cameras and has for its object to provide a combined camera and dark room whereby the negatives may be developed and printed in the camera box or body without entirely removing the same whereby they can be affected by the light.

A further object is to provide improved means for arranging the plate holder and the back upon the division frame of the camera so as to support the plate in its proper relative position to the back for exposure.

A further object is to provide improved means for adjusting the plate holder and plate over the exposure opening in the back whereby a plurality of impressions may be made on the sensitized plate.

A still further object is to provide a plate holder of a very novel construction whereby the plate receiving opening may be converted into a horizontal or vertical parallelogram or vice versa to receive the plate in different positions.

Another object resides in the provision of a camera of comparatively simple construction in the body of which rearwardly of the division frame a complete printing and developing outfit is arranged, the body of said camera being so constructed as to diffuse the proper light within the box and to permit the operator to clearly see the progress of the different operations.

With these and other objects in view, the invention consists of the novel features of construction and the combination and arrangement of parts hereinafter fully described and claimed, and illustrated in the accompanying drawings, in which—

Figure 1 is a vertical longitudinal section of a camera constructed in accordance with the present invention; Fig. 2 is a section taken on the line 2—2 of Fig. 1; Fig. 3 is a section taken on the line 3—3 of Fig. 1; Fig. 4 is a section taken on the line 4—4 of Fig. 1; Fig. 5 is a section taken on the line 5—5 of Fig. 4; Fig. 6 is a detail perspective view of the back; Fig. 7 is a similar view of the vertically movable plate frame carrier; Fig. 8 is a detail perspective view showing the convertible plate holder adapted to be arranged in the camera; and Fig. 9 is a similar view illustrating the operation of said holder.

Referring more particularly to the drawings 5 indicates the body or box of the camera which may be supported upon a tripod if desired and has the usual bellows 6 connected to its forward end. The body of the camera is provided with a hinged top 7 and a ruby glass 8 is centrally secured in said top.

A division frame 9 is arranged in the forward end of the camera body and may be either fixed or removably secured in position. The opposite edges of this frame are spaced from the sides of the camera body and are provided with longitudinal flanges 10. Adjacent to these flanges vertical strips 11 are secured. The division frame is provided with a rectangular opening 12 which extends from the top thereof to a point adjacent to the bottom of said frame. This opening is adapted to receive the plate holder. The opposed edges of the side strips 11 are provided with longitudinal grooves 13 which are adapted to receive the edges of the plate holders, as will hereinafter appear. A plate receiving frame 14 is hinged in the opening 12 to one side of the division frame. A block 15 is also hinged to said frame at the lower edge of the opening. The opening 12 is in line with an opening 16 formed in the front wall of the camera body from which extends the bellows 6. In the outer end of this bellows the usual lens is carried which is adapted to focus the light rays through the opening 16 upon the sensitized plate arranged in the hinged frame 14. In order to permit the arrangement of the plate in the division frame in either a horizontal or a vertical position, the hinged block 15 is provided. When it is desired to arrange the plate vertically, the same is inserted into the frame 14 between the guide strips 14' secured on the upper and lower ends thereof and the side strips of said frame. The hinged frame is then moved upon its hinges into the opening 12 of the division frame and the light rays will be focused upon the exact center of the plate. If it is desired to arrange the plate horizontally in the division frame, the hinged plate holding frame 14 is removed from the opening 12 and the block 15 raised to position the same in the lower end of said opening. The plate is now inserted in a horizontal position, the ends of the plate being engaged in the grooves 13 of the strips 11 secured to the edges of the division frame 9. The plate is forced down in the opening 12 until its lower edge engages upon the block 15. It is then disposed in proper alinement with the lens so that the light will be properly diffused upon its sensitized surface. The front wall of the camera and the division frame in the present instance are shown connected by the members 17, said members supporting between them an inclined partition 18 which forms the bottom of the opening 16 between the front wall of the camera and the division frame.

In order to adapt my improved camera for use with plates of different sizes, I employ a removable plate holder shown in detail in Figs. 8 and 9. This holder comprises a U-shaped frame body 20 the parallel arms of which form the sides of the holder and are provided in their opposed edges with the longitudinal grooves 21. Upon each outer edge of the sides of the holder a longitudinal rib or cleat 22 is formed. These ribs are adapted to engage in the longitudinal grooves 13 for the insertion of the holder in the division frame 9. Upon the opposed grooved edges of the side bars of the holder, a strip 23 is hinged. These strips are also provided in their free longitudinal edges with the grooves 24. It will be noted, however, that the strips terminate or are spaced from the lower connecting portion of the holder. Upon this connecting portion a block 25 is hinged which is of sufficient length to fit into and close the lower portion of the space between the side arms or bars of the holder. Upon the block 25 a second block 26 is hinged. This block is considerably smaller and is adapted to be received between the opposed edges of the hinged strips 23.

In the use of the plate holder above described, when it is desired to arrange the plate therein so that the same will be disposed vertically in the division frame, the two side strips 23 are arranged within the opening between the spaced arms of the U-shaped holder. The plate is now inserted into the opposed grooves 24 in the edges of these strips and forced down into engagement with the lower connecting bar of the holder. In order to insert the plate in a horizontal position, the side strips 23 are swung outwardly upon the face of the holder and the larger block 25 is swung up between the side arms of the frame. The plate is now inserted into the grooves 21 of the holder and forced down upon said block. When arranged in either position as just described, the lens and plate will be properly alined to focus the light rays. It will be understood that the convertible holder 20 is adapted to receive a smaller plate than the hinged frame 14. After the small plate has been properly arranged in the removable holder, the longitudinal cleats or ribs 22 on the edges thereof are inserted into the forward longitudinal grooves 13 in the strips 11 secured to the sides of the division plate. In order to take two pictures on one plate, the holder 20 is arranged with both of the side strips 23 and the bottom blocks 25 and 26 in position between the parallel arms of the holder. The plate is then inserted in the groove 24 of the strips 23 and engaged upon the upper edge of the block 26. One-third of the plate will then be exposed to the focused rays of light and after the exposure has been made, the plate is removed and the unexposed end then inserted into the grooves and engaged upon the block 26. A second exposure is now made so that a negative is secured upon each end of the plate. Still another exposure may be made by removing the side strips 23 from between the arms and also the block 26. The plate will then be in position to receive an impression on its central unexposed portion so that a third negative is secured.

By constructing the plate holder in the manner above set forth the same may be very quickly converted so as to provide a vertical or horizontal parallelogram between the side arms of the holder to receive the sensitized plate. In this manner the necessity of providing a large number of plate holders of different sizes is eliminated. While I have described the strips 23 and blocks 25 and 26 as being hingedly connected to the edges of the plate receiving opening of the holder, it will be understood that these arms and blocks may be movably arranged thereon by any other desired means.

The above description sets forth the construction and manner in which the camera is used when taking large photographs, and in order to adapt the device for taking small pictures in large numbers such as are commonly known as "ping pongs," I provide additional devices which will now be specifically described. In carrying out the last named object of the invention, a back 27 is employed. This back is provided with a central opening of the desired size and shape to which the exposed portion of the plate must correspond. The face of the back with which the plate engages is covered with a soft black cloth whereby injury to the plate or the diffusion of light upon the sensitized surface of the same around the edge of the opening 28 will be entirely eliminated. Upon the other face of the back 27 and adjacent to each end thereof a strip 29 is secured. This strip is formed with a rabbet which receives the flange 10 upon the side of the division frame 9. The back may thus be readily inserted or removed and the rabbeted strips and flanges serve to properly support the same. A plate carrier 30 is vertically movable with relation to said back. This plate carrier is formed with the vertical channel bars 31 which engage over the side edges of the back. The rear flanges of the channel bars are integrally connected to each other by the longitudinal plates 32. To the other flange of each channel bar one end of a leaf spring 33 is secured. The free end of this spring bears upon the back 27 and holds the covered surface of the same securely upon the face of the sensitized plate to prevent any relative movement of said plate and back. These springs further serve to hold the carrier in its vertical adjusted position upon the back.

To one side of the lower connecting plate 32 of the carrier a bar 34 is secured. This bar serves as a ledge and supports the plate frame 35. It will be noted that the lower bar of the plate frame extends above the upper edge of the bottom plate 32. The plate carried by said frame is of sufficient size to receive a large number of impressions upon its sensitized surface and is longitudinally movable upon the bar 34 to position the same with relation to the opening 28 in the back after each exposure. In order to insure the proper extent of movement of the plate, the lower connecting plate 32 of the carrier is provided with the graduations 36. The lower bar of the frame in which the plate is arranged is similarly graduated, as at 36$^a$. The space between these graduations indicates the width of each picture and after one picture is taken the operator moves the plate and frame upon the supporting bar 34 until the graduations on the frame aline with the next succeeding graduation on the plate or connecting bar 32. This is continued until a series of impressions have been made entirely across the plate. It must then be returned to its original position and before it is again exposed it must also be moved vertically or upward upon the back 27 so as to arrange the next series of impressions beneath those which were first taken. In order to do this and to provide for the proper extent of such vertical movement, the upper plate 32 of the carrier is provided with an indicating mark 37$^a$ adjacent to each end which is adapted to aline with the graduations 37 provided upon the faces of the vertical strips 38 which are secured to the sides of the plate and paper boxes 39 arranged upon the opposite side walls of the camera body. Thus when the carrier and the plate are to be vertically adjusted, the carrier is forced upwardly upon the edges of the back 27 until the indicating marks 37$^a$ register with the next succeeding graduation on the strips 38. Upon the release of upward pressure upon the carrier the springs 33 exert their tension to securely hold said carrier and the plate in such adjusted position. The plate and its frame are now moved longitudinally between the carrier and the back as before described to receive the next succeeding series of impressions.

By the above combination and arrangement of parts, it will be seen that a large number of small negatives may be taken upon the same plate in a minimum length of time, the plate and its frame being manually adjustable and as the operator may at all times see the interior of the camera body, these adjustments may be very accurately made and all liability of error avoided.

In the manufacture of cameras as heretofore constructed, the plates are often spoiled by being exposed to the light after they are removed from the camera. In the construction of my improved camera this danger is eliminated by the provision of sufficient space in the camera body and in the rear of the division frame, to provide a dark room in which the negatives may be developed and printed. To this end the plate and paper supporting boxes 39 are arranged within the camera body, and similar boxes or shelves 40 are also arranged in the forward end of the body in the top thereof and at each side. These boxes are adapted to contain plates and printing paper of different sizes to which the camera may be adapted.

In the rear end of the camera body an opening 41 is provided through which the operator may insert his arm to the inside of the camera body. A cloth is secured around this opening provided with a draw string in its end adapted to be tightly drawn and tied around the sleeve and arm so as to prevent light entering the interior of the camera. A small window 42 is provided in the end of the camera body which may be opened by the operator to permit him to see within the interior of the camera. In one of the side walls of the camera body, an aperture is formed to receive the plate 43 from which the prints are to be made. Guide rails 44 are secured to the exterior of this wall above and below the apertures. In these guides a sliding closure 45 is arranged which is adapted to be moved over said aperture to close the same. Within the camera body the developing trays and materials are arranged. These various materials are well known and will not here be set forth. After the plate 43 has been properly developed, it is arranged together with the printing paper in position over the aperture in the body and the sliding closure or shutter moved to admit the light to said opening. This light may be either natural or artificial so that it will have the desired effect. The ruby glass 8 which is provided in the hinged cover 7 will admit sufficient light to the interior of the camera to permit the operator to adjust the plate carrier when taking a number of impressions upon a single plate. His arm extends through the opening in the rear end of the camera body and all possibility of the entrance of light to the interior of the camera is prevented whereby the best possible results are secured. The top of the camera may be very closely secured upon the side and end walls thereof in any desired manner.

From the foregoing it will be seen that I have devised an improved camera of comparatively simple and inexpensive construction and one which is admirably adapted for the purposes in view. It is also highly efficient in operation and may be manufactured at a comparatively low cost. The convertible plate holders permit of the utilization of the camera for varying purposes without necessitating the carrying of a large number of plate holders.

While I have shown and described the preferred embodiment of my invention, it will be understood that the same is susceptible of many minor modifications without departing from the essential features or sacrificing any of the advantages thereof.

Having thus described the invention what is claimed is:

1. In a camera, the combination with a division frame having an opening therein, of a plate receiving frame on said division frame movable into said opening, and a block hinged to said frame at the lower end of said opening to support the plate therein in a horizontal position.

2. In a camera, the combination of a division frame having an opening therein, and a plurality of plate holding elements secured to said frame, and movable into and out of the opening thereof, to convert the same into a horizontal or vertical parallelogram to support a sensitized plate therein in different positions.

3. In a camera, the combination with a division frame having an opening, of a plate holder hinged to said frame at one side of the opening and adapted to be disposed therein to support a sensitized plate in a vertical position, and a block movably secured upon the division frame below the opening and adapted to be moved into the opening to support said plate in a horizontal position.

4. In a camera, the combination with a division frame having an opening, of guide means on the frame adapted to support a plate in said opening, a plate receiving frame carried by the division frame and removably disposed in said opening to support the plate in a vertical position and a block hinged to the division frame below the opening adapted to be moved into the same to support the plate in a horizontal position.

5. In a camera, the combination with a division frame, having an opening, of guide means on the frame at each side of the opening adapted to receive the edges of a photographic plate to support the same in a horizontal position, means secured to the division frame below the opening therein, and movable into said opening to support the plate therein in a horizontal position.

6. In a camera, the combination with a division frame having a guide flange on each side thereof, of a back engaging with said flanges and vertically movable with relation to the frame, a plate carrier movable upon said back, said back having an opening therein, a plate frame in the carrier adapted to be manually adjusted horizontally with relation to the opening, and means for supporting said carrier in its adjusted positions.

7. In a camera, the combination with a division frame having a vertical flange on each side thereof, of a back provided with rabbeted strips adjacent to opposite edges adapted to receive said flanges, a plate carrier vertically movable upon the back, said back having an opening therein, and a plate frame in said carrier adapted to be horizontally moved with relation thereto to adjust the same with respect to the opening.

8. In a camera, the combination with a division frame having a vertical guide flange on each side thereof, a back provided with a rabbeted strip adjacent to each vertical edge adapted to receive the flange to support said back, said back having an exposure opening formed therein, a plate carrier having channeled edges to receive the vertical edges of the back, said carrier being vertically adjustable, a plate frame horizontally movable with respect to the carrier and adapted to be manually adjusted and means for yieldingly holding the carrier in its adjusted positions.

9. In a camera, the combination with a division frame, of a back movably associated with said frame, said back having an exposure opening therein, a carrier having channeled end bars engaged and vertically adjustable upon the side edges of the back, and parallel plates connecting said bars, a plate frame movably arranged on one of said plates for horizontal adjustment with respect to the opening in the back, means for determining the extent of movement of the plate frame, means for determining the extent of movement of the carrier, and means for securing the carrier in its adjusted positions.

10. In a camera, the combination with a division frame, of a back movably associated therewith, a plate carrier adjustably engaged with said back for vertical movement, said back having an exposure opening therein, said carrrier extending in spaced longitudinal relation across one side of the back, graduations on the carrier, vertical strips arranged adjacent to each end of the carrier and having graduations alining with the graduations on said carrier to determine the proper extent of the vertical movement of the carrier, means for securing said carrier in its adjusted positions, and means arranged on the carrier for movably supporting a plate thereon, said last named means being adapted for manual horizontal adjustment over the opening in the back.

11. In a camera, the combination with a division frame, of a back associated therewith, a plate carrier vertically movable with relation to the back, means carried by the carrier engaging said back to support the carrier in its adjusted positions, said back having an exposure opening therein, and a plate frame horizontally adjustable in the carrier for arrangement with respect to said opening.

12. In a camera, the combination with a back having an exposure opening therein, of a carrier having vertical channel side bars engaging the edges of the back, leaf springs arranged in said channels engaging the back, said carrier being vertically movable on the back and supported in its adjusted position by said springs, a plate frame horizontally movable in the carrier, means for determining the proper extent of vertical movement of the camera to position the plate with respect to the exposure opening, said plate being adapted to be manually adjusted in the carrier, and means for determining the proper extent of such adjustment for the successive exposures of the plate.

13. A plate holder comprising a holding frame having an opening therein extending through one end of the frame, and means hinged upon the edges of said opening and movable into the same to convert the opening into a vertical or horizontal parallelogram to support a photographic plate in different positions.

14. A plate holder comprising a rectangular frame having an opening therein extending through one end of the frame, and a plurality of plate receiving elements secured to the frame, and movable independently of each other into the opening in said frame to convert the opening into a vertical or horizontal parallelogram to support a photographic plate in different positions.

15. A plate holder comprising a frame having an opening therein, provided with guide means at opposite edges of the opening to receive a photographic plate, and a plurality of elements secured to the holder at one end of the opening therein, and independently movable into said opening, for engagement by the end of the plate to limit its movement into the opening.

16. A plate holder having an opening therein provided with grooves in its opposite edges to receive a photographic plate, guide means movably arranged upon the grooved edges of the opening and movable into the same, and means movably secured on the holder and associated with said guide means for movement into one end of the opening for engagement by the end of the plate to support the same in the holder in different positions.

17. A plate holder comprising a frame having an opening therein, said frame being longitudinally grooved at each side of the opening, bars hinged upon the sides of the frame movable into said opening, said bars being also provided with grooves to receive the plate, and means movably carried by the holder below said bars and movable into the opening whereby said opening may be converted into a horizontal or vertical parallelogram to support the plate.

18. A plate holder comprising a substantially rectangular U-shaped frame, the arms of said frame being grooved in their opposed edges to receive a plate, bars movably carried by said arms adapted to be arranged in the opening, said arms being likewise grooved to receive the plate and a plurality of blocks movably carried by the frame adapted to be disposed in said opening to convert the same into a horizontal or vertical parallelogram to support the plate.

19. A plate holder comprising a rectangular frame having an opening therein, bars hinged upon said frame on each side of the opening and movable into the same, the opposed edges of said bars being grooved to receive a plate, said bars terminating short of one end of the opening and a block hinged to the holder movable into the opening below the bars to convert said opening into a horizontal or longitudinal parallelogram to support the plate.

20. A plate holder comprising a frame having an opening therein, said frame on each side of the opening being provided with longitudinal grooves to receive a plate, a bar hinged upon the frame at each side of the opening, said bars having their opposed edges grooved to receive a plate, a block hinged upon the frame below said bars, said bars being disposed above the lower edge of the opening whereby said block may be moved into the same and a second block hinged upon said first named block movable into the opening between the lower ends of the bars, said bars and blocks being adapted to support a plate in the frame in different positions.

In testimony whereof I hereunto affix my signature in the presence of two witnesses.

SYLVESTER JAMES WEST.

Witnesses:
R. M. NOWELL,
G. W. EVANS.